(12) United States Patent
Melzer et al.

(10) Patent No.: US 9,440,841 B2
(45) Date of Patent: Sep. 13, 2016

(54) BEVERAGE DISPENSER SYSTEMS

(71) Applicant: Epoca International, Inc., Boca Raton, FL (US)

(72) Inventors: Brian Melzer, Boca Raton, FL (US); Matthew L. Chin, New York, NY (US); Gareth Brown, Jersey City, NJ (US)

(73) Assignee: Epoca International, Inc., Boca Raton, FL (US)

( * ) Notice: Subject to any disclaimer, the term of this patent is extended or adjusted under 35 U.S.C. 154(b) by 155 days.

(21) Appl. No.: 14/166,168

(22) Filed: Jan. 28, 2014

(65) Prior Publication Data

US 2015/0210526 A1  Jul. 30, 2015

(51) Int. Cl.
| | | |
|---|---|---|
| *A47J 31/00* | (2006.01) | |
| *B67D 3/00* | (2006.01) | |
| *A47J 31/06* | (2006.01) | |
| *B67D 1/07* | (2006.01) | |

(52) U.S. Cl.
CPC .......... *B67D 3/0058* (2013.01); *A47J 31/0626* (2013.01); *A47J 31/0636* (2013.01); *B67D 3/0009* (2013.01); *B67D 3/0012* (2013.01); *B67D 1/07* (2013.01); *Y10T 403/7039* (2015.01)

(58) Field of Classification Search
CPC ............ A47J 31/0636; A47J 31/0626; B67D 3/0009; B67D 3/0012
USPC .......... 99/322, 319, 318, 290, 287; 222/132, 222/146.6, 146.1, 192, 145.6
See application file for complete search history.

(56) References Cited

U.S. PATENT DOCUMENTS

| | | | | |
|---|---|---|---|---|
| 1,003,428 A | * | 9/1911 | Brust ...................... | A47J 31/20 126/376.1 |
| 1,910,614 A | * | 5/1933 | La Fazan .............. | A47J 31/007 99/287 |
| 2,093,980 A | * | 9/1937 | Linger ................... | A47G 19/14 99/285 |
| 5,472,274 A | * | 12/1995 | Baillie ................... | A47G 19/12 222/146.6 |
| 7,946,752 B2 | * | 5/2011 | Swartz ............... | A47G 19/2205 366/243 |

* cited by examiner

*Primary Examiner* — Reginald L Alexander
(74) *Attorney, Agent, or Firm* — Akerman LLP

(57) ABSTRACT

A core coupling module for use with a dispenser system includes a plurality of sockets. Each of the plurality of sockets includes a socket fitting configured to couple to a compatible core fitting configuration. At least two of the plurality of sockets each include a socket fitting configured to couple to the same compatible core fitting configuration.

19 Claims, 10 Drawing Sheets

BEVERAGE DISPENSER SYSTEMS

TECHNICAL FIELD

The present description relates generally to dispenser systems and, more specifically, to dispenser systems configured for interchangeable coupling of multiple implements to modulate characteristics of a beverage.

BACKGROUND

Preparing, transporting, and delivering beverages often requires utilizing multiple tools, containers, and various other cumbersome resources. For example, beverage preparation may include the addition of flavor or added nutrition to the beverage by infusing or mixing ingredients, which may require using multiple implements as well as multiple containers suitable for the various preparation tasks. Such containers, however, may also be limited in convenience and versatility with respect to transporting and delivering the beverage. Preparation, containment, transportation, and delivery of the beverage may be further complicated when there is a need to bring the beverage to or maintain the beverage at a desired temperature. What are needed are systems and apparatuses to provide convenient preparation and containment of beverages as well as transportation and delivery of the beverages.

FIGURES

The novel features of the described embodiments are set forth with particularity in the appended claims. The described embodiments, however, both as to organization and manner of operation, may be best understood by reference to the following description, taken in conjunction with the accompanying drawings in which:

SUMMARY

Figure 1:
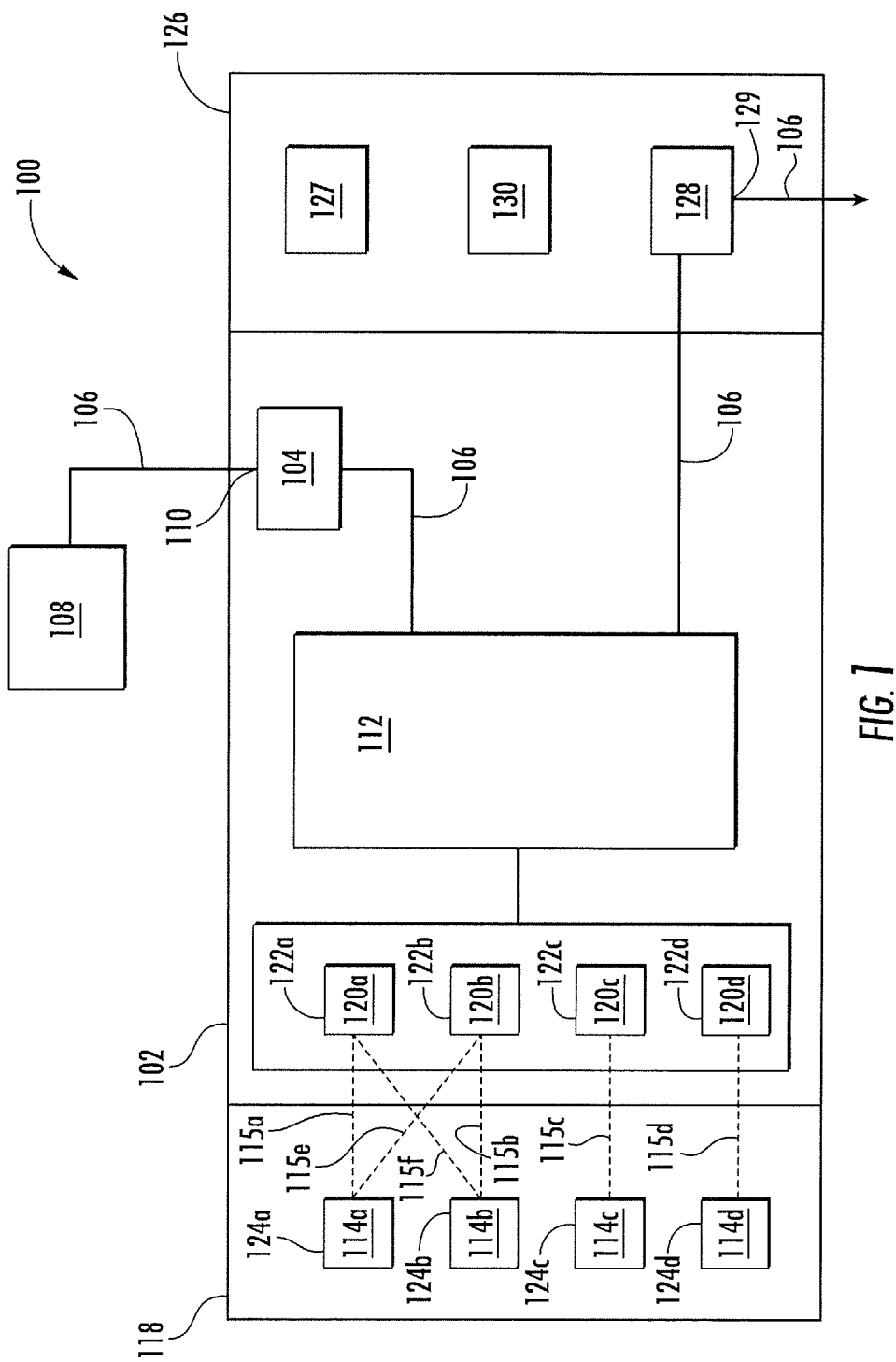
FIG. 1 is a schematic representation of a dispenser system according to various embodiments described herein.

In one aspect, the various embodiments disclosed herein are directed to a core coupling module for use with a dispenser system. A core coupling module for use with a dispenser system may comprise a plurality of sockets, each comprising a socket fitting, and which are configured to couple to a compatible core fitting configuration. At least two of the socket fittings are configured to couple to the same compatible core fitting configuration. In one embodiment, at least two socket fittings are configured to interchangeably couple core modules comprising the same compatible core fitting configuration to a beverage dispenser system. In another embodiment, the at least two socket fittings are configured to lockingly engage the same compatible core fitting configuration. In yet another embodiment, the at least two socket fittings are configured to interchangeably couple the core modules to the dispenser system such that the core modules are positioned to modulate at least one characteristic of a liquid associated with the dispenser system. The at least two socket fittings may comprise at least three socket fittings. In one embodiment, the core modules may comprises at least two of an agitation core, a thermal core, and an infusion core. At least one of the core modules may comprises an infusion core comprising an infusion basket configured to receive a muddling stick translatable therein to muddle an infusion item and thereby modulate a flavor characteristic of the liquid associated with the beverage system. At least one of the core modules may comprise a sleeve defining the same compatible core fitting configuration. The at least one core module may further comprise an implement portion configured to be selectively couplable to the sleeve. In one embodiment, when the core modules are received by the plurality of sockets, the core coupling module is configured to position the core modules within an internal volume defined by the dispenser system. In one embodiment, the core coupling module comprises a cover configured to couple to the dispenser system. The plurality of sockets may be disposed on the cover, and the cover may define a wall configured to at least partially define an internal volume of the dispenser system when coupled to the dispenser system.

In another aspect, a dispenser system comprises a reception module, a containment module, and a core coupling module. The reception module comprises a first fluid port configured to receive a liquid from a liquid source external to the dispenser system. The containment module comprises a body configured to contain the liquid received by the reception module within an internal volume. The core coupling module is configured to interchangeably couple a plurality of core modules to the liquid within the internal volume. The core modules are configured to modulate a characteristic of the liquid within the internal volume. The core coupling module comprises a plurality of sockets each configured to interchangeably couple the plurality of core modules to the liquid within the internal volume. Each of the plurality of sockets may comprise a socket fitting configured to lockingly engage a complementary core fitting disposed on each of the plurality of core modules. In one embodiment, the core coupling module comprises a cover configured to be positioned on the body, and wherein the plurality of sockets are disposed on the cover. The cover may be movable between an open position and a closed position. When the cover is in the open position, the first fluid port is at least partially open to expose the internal volume. In one embodiment, the dispenser system further comprises a delivery module. The delivery module comprises a valve fluidically coupled to the internal volume through a second fluid port. The valve is selectively actuatable between an open position and a closed position to control delivery of the liquid from the internal volume to an environment external to the dispenser system. In another embodiment, the dispenser system further comprises an implement subsystem comprising the core modules configured to be interchangeably coupled to the liquid by the core coupling module. The core modules comprise at least two of an agitation core, a thermal core, and an infusion core.

In yet another aspect, a cover for a beverage dispenser comprises a plurality of sockets each comprising a socket fitting configured to couple a compatible core fitting configuration of a core module to couple the core module to the dispenser system. The plurality of sockets comprise a first socket comprising a first socket fitting compatible with a first core fitting configuration and a second socket comprising a second socket fitting compatible with a second core fitting configuration. The first socket fitting is further compatible with the second core fitting configuration such that the first socket is configured to interchangeably couple core modules comprising either the first core fitting configuration or the second core fitting configuration. In one embodiment, the plurality of sockets further comprises a third socket comprising a third socket fitting compatible with a third core fitting configuration and at least one of the first core fitting configuration and the second core fitting configuration such that the third socket is configured to interchangeably couple at least one of core modules comprising either the first core fitting configuration or the third core fitting configuration and core modules comprising either the second core fitting configuration or the third core fitting configuration. In one embodiment, the first socket, the second socket, and the third socket are configured to interchangeably couple core modules comprising either the first core fitting configuration, the second core fitting configuration, or the third core fitting configuration. In one embodiment, the socket fittings of the plurality of sockets are configured to lockingly engage the compatible core fitting configurations to thereby lock the respective core modules to the respective sockets when coupled thereto.

DESCRIPTION

The present disclosure is directed to dispenser systems, apparatuses, and methods thereof. In general, the various embodiments may comprise a platform for coupling a plurality of core modules to a liquid. The core modules may generally be configured to modulate one or more characteristics of the liquid, e.g., temperature, taste, components, etc. The dispenser system is further configured to receive and thereby contain the liquid for modulation by the plurality of core modules. In some embodiments, the dispenser system further includes or incorporates an implementation subsystem comprising the core modules. In one embodiment, the dispenser system is further configured to deliver the liquid, which may be, for example, a potable beverage from the dispenser system.

In one embodiment, the dispenser system is configured for convenient modulation of liquid on a personal scale or household scale, which may, for example be on a portable or consumer scale. It should be understood, however, that the dispenser systems and related apparatuses and methods disclosed herein are not so limited. For example, the dispenser systems and related apparatuses and methods may find use on a larger, e.g., commercial, scale by employing the same or similar principles disclosed herein. Such versatility of the present disclosure with respect to the embodiments described herein is therefore understood to be within the scope of the present disclosure.

Before explaining the various embodiments of the dispenser systems and related apparatuses and methods in detail, it is noted that the illustrative embodiments are not limited in application or use to the details of construction and arrangement of components illustrated in the accompanying drawings and description. That is, the illustrative embodiments may be implemented or incorporated in other forms, variations and modifications, and may be practiced or carried out in various ways. Furthermore, unless otherwise indicated, the terms and expressions employed herein have been chosen for the purpose of describing the illustrative embodiments for the convenience of the reader and are not for the purpose of limitation thereof.

It is further understood that any one or more of the following-described embodiments, expressions of embodiments, and examples thereof may be combined with any one or more of the other following-described embodiments, expressions of embodiments, and examples.

FIG. 1 is a schematic representation of a dispenser system 100 according to various embodiments. It should be appreciated that while the dispenser system 100 is shown to include certain platforms, modules, and subsystems. Such components and features, however, are provided as examples of some of the variety of components and features that may comprise or be associable with the dispenser system 100. Indeed, unless stated otherwise, dispenser systems 100 according to the present disclosure need not include all such components and features.

The dispenser system 100 comprises a dispenser platform 102. The dispenser platform 102 comprises a reception module 104 configured to receive and thereby intake a liquid 106 from an environment external to the dispenser system 100, such as a liquid source 108. The reception module 104 comprises a first fluid port 110 positioned at an end of an internal volume defined within the dispenser platform 102 configured to receive the liquid 106 for containment by the dispenser platform 102. The first fluid port 110 comprises an open position and a closed position. When the first fluid port 110 is in an open position, the first fluid port 110 is configured to receive the liquid 106 from liquid source 108. For example, in one embodiment, the first fluid port 110 may comprise a valve that may be selectively actuated between the open position and the closed position.

In certain embodiments, the dispenser system comprises a cover at least partially positionable at the first fluid port 110. For example, in one embodiment, the cover is selectively positionable at the first fluid port 110 between a first position and a second position wherein in the first position the cover at least partially exposes the internal volume of the dispenser platform 102 to the external environment and in the second position the cover at least partially seals the internal volume. In certain embodiments, the cover defines at least a portion of the first fluid port 110.

In some embodiments, the reception module 102 further comprises a cap relatively movable with respect to the first fluid port 110 to transition the first fluid port between the open position and the closed position. Conversely, when the cap is in the open position, for example, the first fluid port 110 is open, thereby exposing an internal volume of the dispenser platform 102 to the external environment or liquid source 108. When the cap is in the closed position, the first fluid port 110 is closed, e.g., plugged, thereby preventing reception of liquid 106 through the first fluid port 110. In some embodiments, the reception module 104 comprises multiple first fluid ports 110 selectively openable via one or more caps.

In these or other embodiments, the reception module 102 may comprise a concave structure including a recessed portion that extends from a first end having a first cross-sectional area to a second end positioned proximate to the external environment and which has a second cross-sectional area that is greater that the first cross-sectional area. In certain embodiments, the reception of the liquid 106 may be actively assisted, e.g., via a pump, or passively assisted, e.g., via gravity.

In various embodiments, the dispenser system 100 further comprises a containment module 112 configured to fluidically couple to the reception module 104 such that the liquid 106 received by the reception module 104 may be transmitted to the containment module 112 for containment. The containment module 112 generally includes a hollow body defining the internal volume that is configured to contain the liquid 106. In various embodiments, the containment module 112 is configured to portably contain the liquid 106. In some embodiments, the containment module 112 is configured to contain the liquid 106 in proximity to one or more core modules 114a, 114b, 114c, 114d. As described in more detail below, the one or more core modules 114a, 114b, 114c, 114d so positioned are configured to modulate one or more characteristics of the liquid 106.

In certain embodiments, the dispenser system 100 further comprises a core coupling module 116. The core coupling module 116 is configured to receive and couple two or more core modules 114a, 114b, 114c, 114d of an implement subsystem 118 to the dispenser platform 102. The core coupling module 116 comprises a plurality of sockets 120a, 120b, 120c, 120d each configured to receive a core module 114a, 114b, 114c, 114d (broken lines 115a, 115b, 115c, 115d). Each socket 120a, 120b, 120c, 120d comprises a socket fitting 122a, 122b, 122c, 122d configured to couple to a compatible core fitting configuration 124a, 124b, 124c, 124d associated with a core module 114a, 114b, 114c, 114d. That is, each core module 114a, 114b, 114c, 114d comprises a core fitting 124a, 124b, 124c, 124d for coupling the core module 114a, 114b, 114c, 114d to a socket 120a, 120b, 120c, 120d. For example, in one embodiment, the core coupling module 116 comprises a first socket 120a comprising a first socket fitting 124a configured to couple a first compatible core fitting 124a of a first core module 114a and a second socket 120b comprising a second socket fitting 122b configured to couple a second compatible core fitting 124b. In the illustrated embodiment, the core coupling module 116 further comprises a third socket 120c comprising a third socket fitting 122c configured to couple a third compatible core fitting 124c of a third core module 114c and a fourth socket 120d comprising a fourth socket fitting 122d configured to couple a fourth compatible core fitting 124d of a fourth core module 114d.

In some embodiments, the core coupling module 116 comprises a plurality of sockets 120a, 120b, 120c, 120d wherein at least two of the sockets 120a, 120b, 120c, 120d comprise socket fittings 122a, 122b, 122c, 122d compatible with a same or similar core fitting configuration 124a, 124b, 124c, 124d. As such, the dispenser platform 102 comprising the core coupling module 116 may provide a convenient platform for coupling the core modules 114a, 114b, 114c, 114d via one or more core fitting configurations 124a, 124b, 124c, 124d, wherein at least one of which being compatible with multiple socket fittings 122a, 122b, 122c, 122d and thus interchangeable therewith. For example, in one embodiment the dispenser platform 102 is configured for interchangeable coupling of core modules 114a, 114b, 114c, 114d, e.g., an ability to couple a core module 114a, 114b, 114c, 114d at different positions with respect to the dispenser system 100 as well as support selective coupling of different or multiple core modules 114a, 114b, 114c, 114d. For example, the first core fitting 124a of the first core module 114a may also be compatible with the second socket fitting 122b of the second socket 120b (broken line 115e). The second core fitting 124b of the second core modules 114b may also be compatible with the first socket fitting 122a or the first socket (broken line 115f). Thus, in at least one embodiment, the core coupling module 116 comprises at least a first socket 120a and a second socket 120b each configured to couple a core module 114a, 114b to the dispenser platform 102 comprising a same or similar compatible core fitting 124a, 124b. Similarly, in one embodiment, the second core 124b fitting of the second core module 124a is also compatible with the third socket fitting 122c of the third socket 120c and the fourth socket fitting 122d of the fourth socket 120d.

It should be appreciated that, in various embodiments, the core coupling module 116 comprises sockets 120a, 120b, 120c, 120d comprising socket fittings 122a, 122b, 122c, 122d compatible with different or multiple core fittings 124a, 124b, 124c, 124d. Beneficially, in certain embodiments, the core coupling module 116 comprises at least two sockets 120a, 120b, 120c, 120d comprising socket fittings 122a, 122b, 122c, 122d configured for cross-compatibility or multiple compatibility. For example, in one embodiment, the first core fitting 124a of the first core module 114a and the second core fitting 124b of the second core module 114b comprise different configurations. The first socket fitting 122a of the first socket 120a is compatible with the second core fitting 124b of the second core 114b as well as the first core fitting 124a of the first core module 114a. In a further embodiment, the third socket fitting 122c is compatible with at least one of the first core fitting 124a of the first core module 114a and the second core fitting 124b of the second core module 114b. The third core fitting 124c of the third core module 114c may be, for example, the same or different than the first core fitting 124a of the first core module 114a and the second core fitting 124b of the second core module 114b. Those skilled in the art will appreciate upon reading this disclosure that numerous combinations of compatibility, cross-compatibility, and multiple compatibility with respect to sockets 120a, 120b, 120c, 120d and core modules 114a, 114b, 114c, 114d are possible and, thus, the present disclosure is not limited by the specific examples provided herein. For example, in one embodiment, all the sockets fittings 122a, 122b, 122c, 122d of the sockets 120a, 120b, 120c, 120d are compatible with a same or similar core fitting 124a, 124b, 124c, 124d. Additionally, one or more of sockets 120a, 120b, 120c, 120d may comprise a socket fitting 122a, 122b, 122c, 122d compatible with a core fitting 124a, 124b, 124c, 124d that is not compatible or is only compatible with the one or more sockets 120a, 120b, 120c, 120d. In these or other embodiments, the core coupling module 116 may comprise additional sockets having socket fittings compatible with the first core fitting 124a, second core fitting 124b, third core fitting 124c, fourth core fitting 126d, or additional core fittings. In various embodiments, the core coupling module 116 comprises a plurality of sockets 120a, 120b, 120c, 120d, all of which being compatible with the same or similar core fitting configuration 124a, 124b, 124c, 124d, which may for example, comprise a universal socket or core fitting. Thus, the compatibility of the socket fittings 122a, 122b, 122c, 122d of the sockets 120a, 120b, 120c, 120d may differ according to the design of the core coupling module 116.

In various embodiments, the dispenser platform 102 of the dispenser system 100 comprises of fitting configured to receive multiple core coupling modules 116 either at the same time or interchangeably. For example, the dispenser platform 102 may be configured to couple to a first core coupling module 116 comprising two or more sockets 120a, 120b, 120c, 120d. In various embodiments, the dispenser platform 102 comprises or is configurable to couple a second core coupling module comprising two or more sockets. In certain embodiments, the second core coupling module may be coupled to the dispenser platform 102 in addition to or in place of the first core coupling module 112 and may or may not comprise the same number, arrangement, or socket fitting configuration as the first core coupling module 112. Thus, the dispenser platform 102 may be further expanded by incorporation of multiple core coupling modules 112. For example, core coupling modules 112 comprising different configurations, arrangements or orientations of sockets and socket fittings may be coupled to the dispenser system 100 to expand the dispenser platform 102.

In various embodiments, each core module 114a, 114b, 114c, 114d comprises an implement configured to interact with the liquid 106 within the dispenser system 100, e.g., during reception, containment, or delivery. For example, in one embodiment, the implement of a core module 114a, 114b, 114c, 114d is configured to contact the liquid 106 within the internal volume of the containment module 112. In various embodiments, implements may be used to impart flavor, mix, or modulate thermal characteristics of the liquid 106. Depending on the configuration, implements of the core modules 114a, 114b, 114c, 114d may be configured to standalone or operate in conjunction with another implement. As introduced above, the two or more core modules 114a, 114b, 114c, 114d may beneficially comprise various interchangeable core modules 114a, 114b, 114c, 114d that may be selectively interchanged according to a desired result. For example, in one embodiment, a core module 114a, 114b, 114c, 114d comprises a thermal core configured to cool or heat liquid 106 within the dispenser system 100. It is noted that the dispenser system 100 may comprise the dispenser platform 102 absent the implement subsystem 118.

In various embodiments, the dispenser system 100 further comprises or is configured to incorporate an accessory subsystem 126 with the dispenser platform 102. The accessory subsystem 126 may generally comprise or incorporate one or more accessory modules. Accessory modules may be configured to enhance convenience, expand available operations of the dispenser system 100, or otherwise improve an experience of a user. For example, the accessory subsystem 126 may comprise a portability module 127 configured to enhance the portability of the dispenser system 100. Accessory subsystems may also comprise a delivery module 128 configured to deliver, transmit, or transport the liquid 106 from the containment module 112 to another module, system, or environment external to the dispenser system 100. The delivery module 128 may comprise a second fluid port 129 positioned at an end of the internal volume. According to various embodiments, the delivery module 128 may transmit the liquid 106 by any manner known in the art. For example, the delivery module 128 may comprise a pump to actively transport the liquid 106 from the containment module 112 to an external environment. In one embodiment, the delivery module 128 comprises a valve that may be selectively opened to allow the liquid 106 to be transmitted, e.g., actively or passively. Additional accessory modules may include a stability module 130 configured to provide a stable platform for the dispenser system.

FIGS. 2-6 illustrate various views of a dispenser system 200 according to various embodiments. In general, the dispenser system 200 is configured to receive, contain, and dispense a liquid, such as a potable beverage. The dispenser system 200 comprises a dispenser platform 202 that includes a containment module 212 comprising a container having a body 231. The body 231 defines an internal volume 232 having a first end 232a and a second end 232b, as most clearly shown in FIG. 5, which provides a cross-section view of the dispenser system 200 and dispenser platform 202 along line 5 of FIG. 4. The internal volume 232 is dimensioned to contain, a liquid and is defined between a first wall 233 at the first end 232a, a second wall 234 at the second end 232b, and one or more third walls 235 positioned therebetween.

According to various embodiments, the body 231 may be formed, at least in part, of materials suitable for containing liquid during the various operations of the dispenser system 200. For example, in certain embodiments, the body 231 comprises a wood, metallic, mineral, natural or synthetic polymer, ceramic, etc. These or other materials may also comprise coatings, films, rigid, or elastomeric structures.

The body 231 may also comprise one or more opaque or transparent regions. For example, in one embodiment, an outer surface 236 of the body 231 is opaque and comprises, for example, a region of frosted glass. In one embodiment, an outer surface 236 of the body 231 is transparent, comprising, for example, a transparent hard plastic. In some embodiments, all or a portion of the body 231, e.g., a window defined in a wall 233, 234, 235, comprises a transparent region allowing a user to view the liquid when it is contained within the internal volume 232. Additionally, while the body 231 illustrated in FIG. 2 comprises a general cuboidal structure having rectangular cross-sections, in various embodiments the body 231 may comprise any suitable dimensions that at least partial defines an internal volume 232. In certain embodiments, for example, the body 231 may comprise one or more bounded or unbounded geometric or non-geometric shapes, dimensions, or cross-sections, which may include flat or curved faces or edges.

Figure 5:
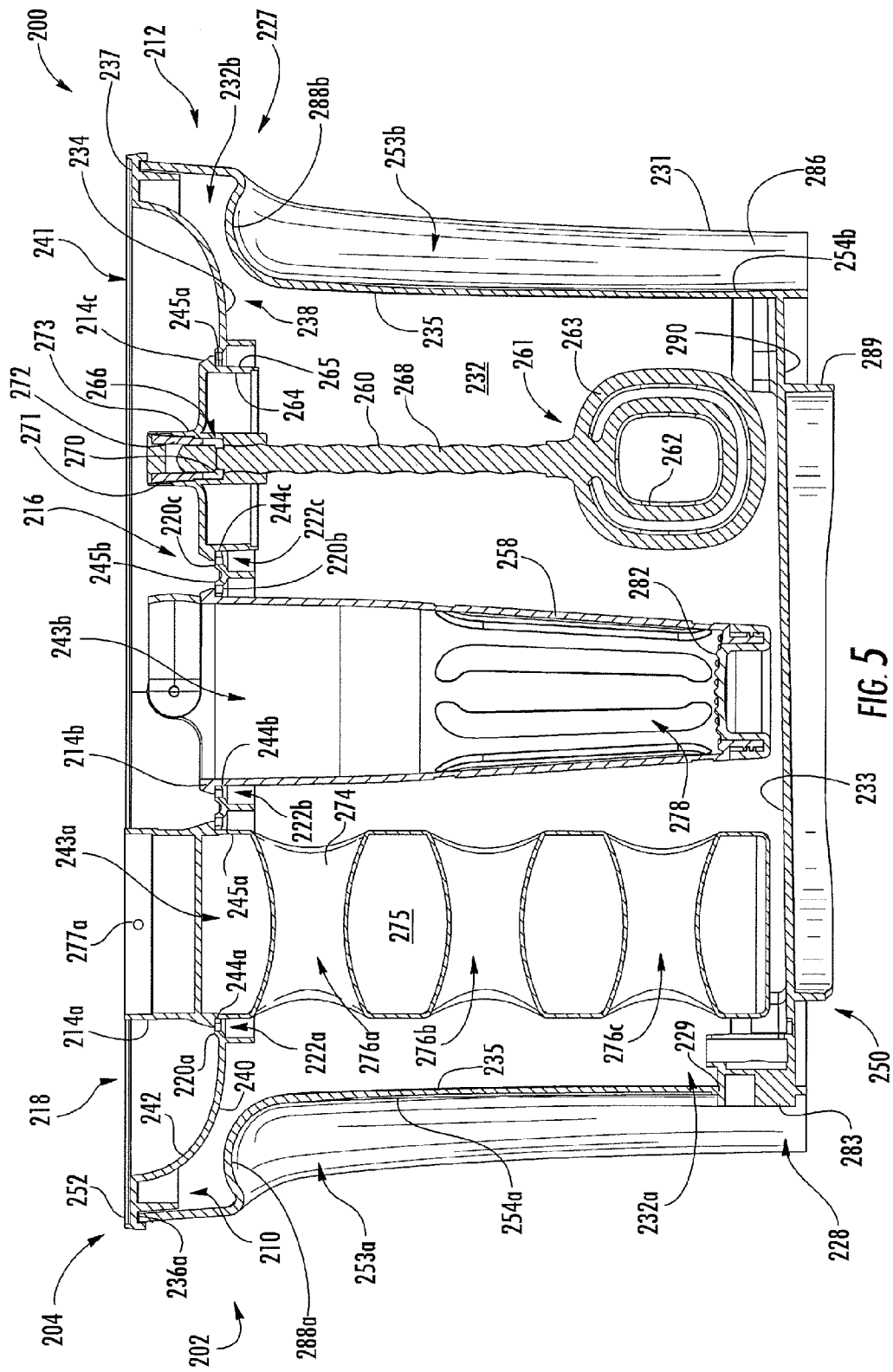
FIG. 5 is a cross-section view of the dispenser system illustrated in FIG. 2 taken along line 5 of FIG. 4 according to various embodiments described herein.
Figure 6:
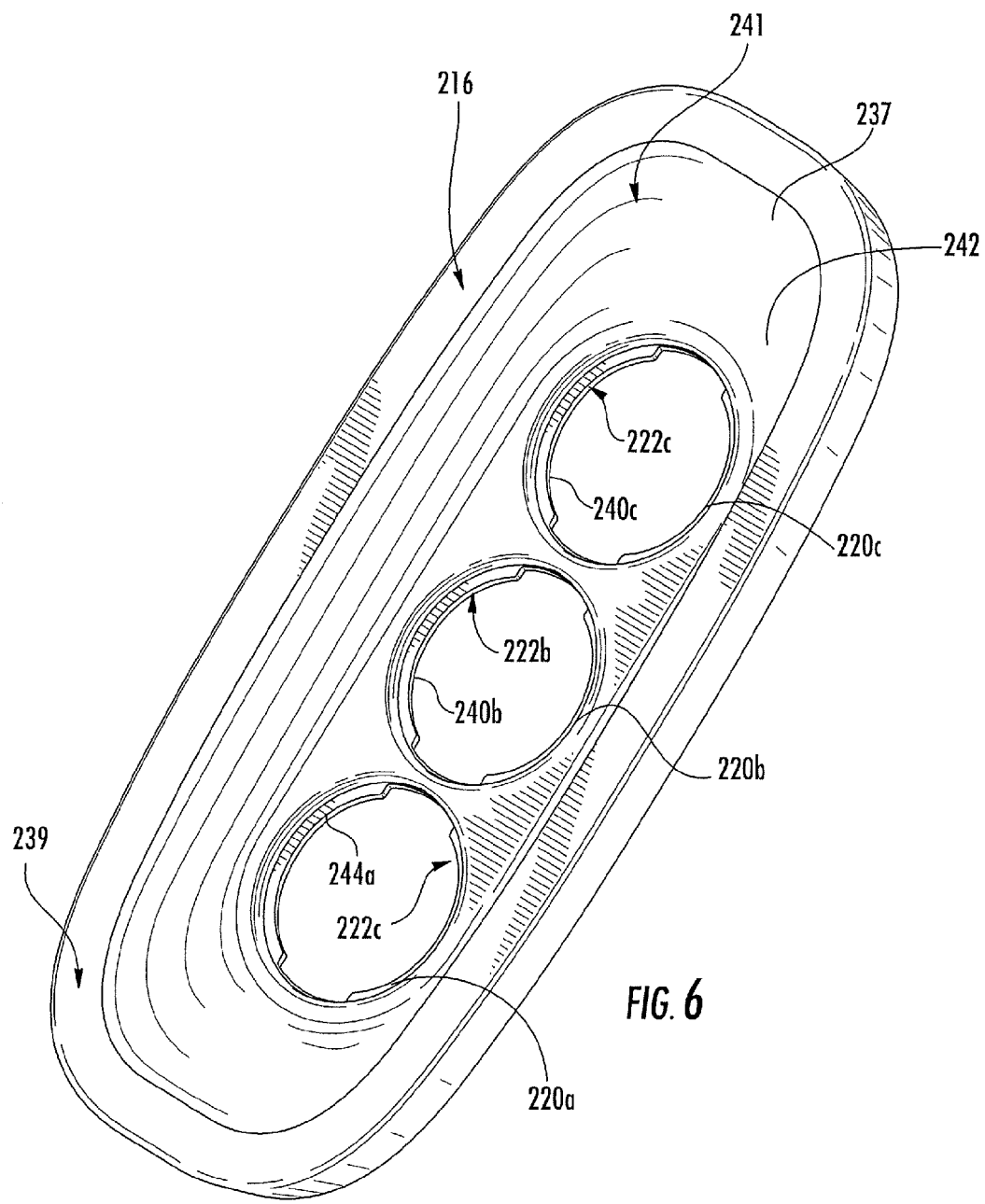
FIG. 6 is an isolation view in perspective of the cover of the dispenser system illustrated in FIG. 2 according to various embodiments described herein.

The body 231 of the dispenser platform 202 further comprises a cover 237, which is illustrated in isolation in FIG. 6. The cover 237 is configured to be positioned on the body 231, e.g., along the second end 232b of the internal volume or at the one or more third walls 235. The cover 237 includes a first end 238 and a second end 239. As most clearly shown in FIG. 5, the first end 238 defines a first surface 240 configured to form at least a portion of the second wall 234. The second end 239 of the cover 237 comprises a recessed portion 241 having a recessed surface 242. In various embodiments, the recessed portion 241 may beneficially limit spillage of liquid from the internal volume 232. For example, liquid or other material that may be expelled from the internal volume 232 of the body 231 or containment module 212 or an internal volume 243a, 243b of a core module 214a, 214b may be captured within the recessed portion 241. The concave surface 242 of the recessed portion 212 may further promote pooling or return of the liquid or material toward the internal volumes 232, 243a, 243b.

Notably, in some embodiments, the cover 237 is integral to the body 231 while, in other embodiments, the cover 237 is movable with respect to at least a portion of the body 231. For example, the cover 237 may be movable between a first open position and a second closed position such that the cover 231 may be physically removed, separated, or detached from the body, e.g., for simplified cleaning or added modularity for increasing the versatility of the dispenser system 200. In various embodiments, the cover 237 may comprise a gasket, seal, or otherwise be configured for sealing engagement at the second end 232b of the internal volume 232, e.g, to the one or more third walls 234, outer surface 236 of the body 231, such as a fitting or rim 236a disposed thereon. Although not shown, in one embodiment, the cover 237 is coupled to the body 231 by a hinge to allow the cover 237 to swing or pivot between the open position and the closed position. In another embodiment, the cover 237 is slidably mountable to the body 231, e.g., via rails or grooves. Thus, in some embodiments, the cover 237 is configured to be positioned on the body 231 such that the first end 238 and surface 240 of the cover 237 at least partially defines the second wall 234.

The dispenser platform 202 of the dispenser system 200 further comprises a core coupling module 216. In the illustrated embodiment, the body 231 and, in particular, the cover 237 comprises at least a portion of the core coupling module 216. That is, the core coupling module is disposed along the second wall 239 and recessed surface 242 of the recessed portion 241. The core coupling module 216 comprises a plurality of sockets 220a, 220b, 220c disposed on the cover 237. The plurality of sockets 220a, 220b, 220c are configured to receive a plurality of core modules 214a, 214b, 214c to thereby couple the dispenser system with an implement subsystem 218 comprising the plurality of core modules 214a, 214b, 214c. In the illustrated embodiment, the plurality of sockets 220a, 220b, 220c of the core coupling module 216 include a first socket 220a comprising a first socket fitting 222a, a second socket 220b comprising a second socket fitting 222b, and a third socket 220c comprising a third socket fitting 222c. The socket fittings 220a, 220b, 220c comprise threads 244a, 244b, 244c configured to threadably couple to compatible threads 245a, 245b, 245c of the core fittings 224a, 224b, 224c. In one embodiment, the core coupling module 216 is configured to lockingly couple one or more core modules 214a, 214b, 214c to the dispenser platform 202. For example, a user may compress or rotate a core module 214a, 214b, 214c within a socket 220a, 220b, 220c to lock the core module 214a, 214b, 214c into position.

In various embodiments, each of the first socket fitting 222a, second socket fitting 222b, and third socket fitting 222c is configured to couple to a compatible core fitting 224a, 224b, 224c either directly or indirectly, e.g., via a sleeve comprising the compatible core fitting 224a, 224b, 224c, not shown. For example, the first socket fitting 222a is configured to couple to a first core fitting 224a, which is disposed on a first core module 214a, the second socket fitting 222b is configured to couple to a second core fitting 224b, which is disposed on a second core module 214b, and the third socket fitting 222c is configured to couple to a third core fitting 224c, which is disposed on a third core module 214c. In some embodiments, the core coupling module 216 in configured to provide a seal between the socket 220a, 220b, 220c and the core module 214a, 214b, 214c to reduce spillage or otherwise provide a sustainable pressure region within the internal volume 232. For example, a gasket may be provided about the circumference of the socket 220a, 220b, 220c, e.g., at the fitting 222a, 222b, 222c, socket 220a, 220b, 220c, second wall 234, outer surface of the body 236, recessed surface 242, or the first or second surface 238, 239 of the cover 237.

In use, reception of a core module 214a, 214b, 214c within a socket 220a, 220b, 220c couples the implement subsystem 218 to the dispenser platform 202 of dispenser system 200 thereby making the core module 214a, 214b, 214c available to modulate a characteristic of the liquid contained within the internal volume 232 of the containment module 212. For example, the core coupling module 212 is configured to position the first core module 214a, the second core module 214b, and the third core module 214c into modulatable contact with the liquid. Such positioning, for example, may beneficially enhance the operability of the core module 214a, 214b, 214c to modulate the characteristic of the liquid contained in the dispenser system 200. In the illustrated embodiment, the sockets 220a, 220b, 220c are provided in a single line wherein the core modules 214a, 214b, 214c extend about perpendicular to the first wall 233 and second wall 234 and about parallel to the one or more third walls 235. In other embodiments, the sockets 220a, 220b, 220c may be provided in additional orientations and arrangements. For example, according to various embodiments, the sockets 220a, 220b, 220c may be provided in multiple rows, columns, including staggered arrangements, and may comprise different sized cross-sections or shapes. In certain embodiments, the core coupling module 216 comprises sockets 220a, 220b, 220c positioned at two or more walls 233, 234, 235. In these or other embodiments, the core coupling module 216 may further comprise at least one socket 220a, 220b, 220c configured to position a core module 214a, 214b, 214c at an angle greater than 0° and less than 90° with respect to an adjacent wall.

As described above, in one embodiment, at least two sockets 220a, 220b, 220c of the plurality of sockets 220a, 220b, 220c comprise a socket fitting 222a, 222b, 222c configured to couple to the same or similar compatible core fitting configuration 224a, 224b, 224c. For example, in the embodiment illustrated in FIGS. 2-6, at least two of the first socket 220a, the second socket 220b, and the third socket 220c comprise socket fittings 222a, 222b, 222c that share at least one compatible core fitting configuration 224a, 224b, 224c. Accordingly, at least two sockets 220a, 220b, 220c are configured to receive and thereby couple the same compatible core fitting 224a, 224b, 224c such that core modules 214a, 214b, 214c comprising a same or similar compatible core fitting configuration 224a, 224b, 224c may be interchangeably received and thereby coupled to the dispenser platform 202 via the core coupling module 216 at the at least two sockets 220a, 220b, 220c. For example, the first core fitting 224a is a compatible fitting for at least one of the second socket fitting 222b and the third socket fitting 222c in addition to the first socket fitting 222a. Thus, in one embodiment, the first core module 214a and the second core module 214b may be couplable or interchangeably couplable to the dispenser platform 202 at either and both the first socket 220a and the second socket 220b of the core coupling module 216. Notably, in various embodiments, the core coupling module 216 comprises sockets 220a, 220b, 220c comprising non-annular cross-sections configured to receive and lockingly retain core modules 214a, 214b, 214c comprising compatible core fittings 224a, 224b, 224c via clips, snaps, taps, fittable grooves, elastomeric wraps or skirts, etc.

The dispenser platform 202 of the dispenser system 200 further comprises a reception module 204 configured to receive a liquid from an environment external to the dispenser system, such as a liquid source (see FIG. 1). The reception module 204 is configured to fluidically couple to the internal volume 232 of the containment module 212. In the illustrated embodiment, the reception module 204 comprises a first fluid port 210 positioned at the second end 232b of the internal volume 232, which is shown in a closed positioned having the cover 237 positioned thereon. That is, the cover 237 may be selectively moved with respect to the body 231 between an open position and a closed position such that the cover 237 may be physically removed, separated, or detached from the body 231. For example, in the open position, the internal volume 232 is exposed at the second end 232a to allow the reception module 204 to receive the liquid. According to various embodiments, the reception module 204 may further comprise one or more of the sockets 220a, 220b, 220c. For example, the sockets 220a, 220b, 220c may comprise selectively openable first fluid ports 210a, 210b, 210e configured to receive the liquid from the liquid source. Notably, the reception module 204 may comprise one or more first fluid ports 210 that extend through the body 231 that do not comprise a socket 220a, 220b, 220c but rather comprise an otherwise plugable first fluid port 210, e.g., in the cover 227 or a wall 233, 234, 235 that is configured to receive the liquid.

Figure 3:
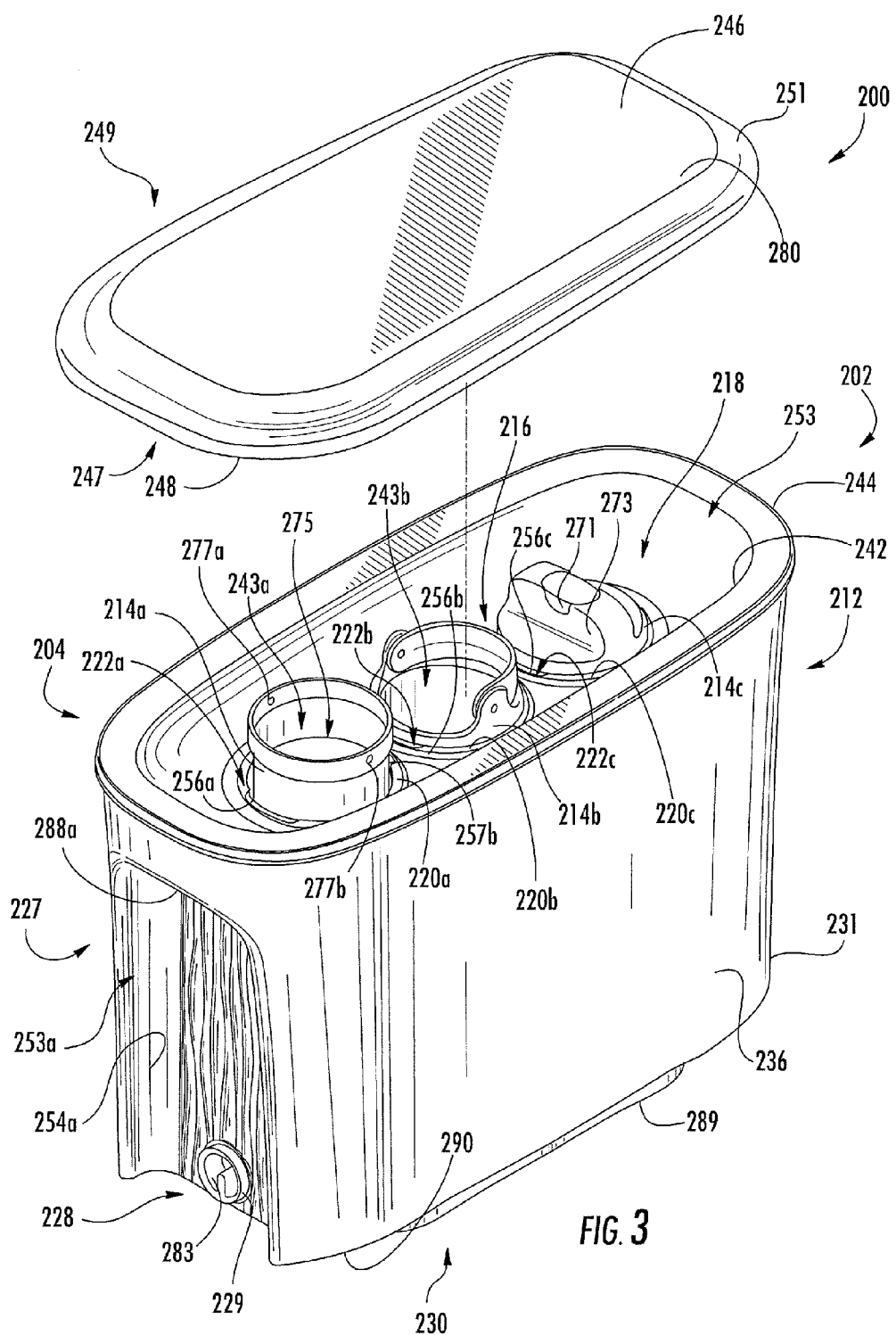
FIG. 3 is a partially exploded view in perspective of the dispenser system illustrated in FIG. 2 further illustrating a lid according to various embodiments described herein.
Figure 4:
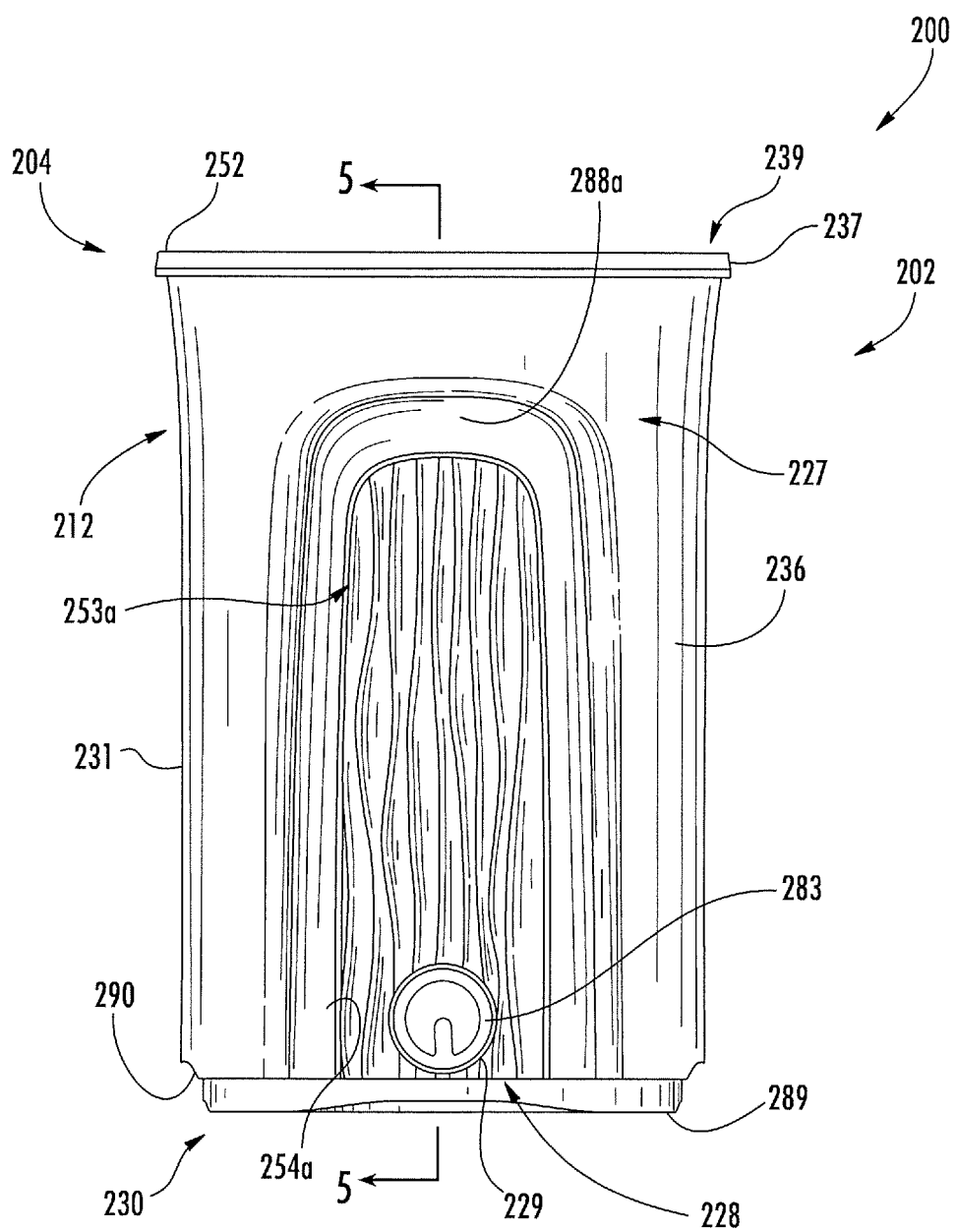
FIG. 4 is an elevated view of the dispenser system illustrated in FIG. 2 according to various embodiments described herein.

Referring to the partially exploded view of the dispenser system illustrated in FIG. 3, in various embodiments, the dispenser system includes a lid 246 configured to be positioned over the cover 237. The lid 246 comprises a first end 247 defining a first surface 248 and a second end 249 defining a second surface 250. The first surface 248 is configured to be positioned adjacent to the cover 237 and generally directed toward the internal volume 232. The second surface 250 is configured to form an outer surface of the dispenser system 100. The lid 247 comprises a rim 251 extending about an outer edge. In the illustrated embodiment, the rim 251 comprises an elastic material configured to elastically engage a rim 252 positioned along an outer edge of the body 231, e.g., an outer edge of the cover 237. For example, the rim 251 of the lid is configured to stretch to thereby wraps around the rim 252 positioned at the outer edge of the body 231.

In various embodiments, the lid 247 may be mountable to the body 231 via complementary grooves, threads, clips, or snaps, for example. In certain embodiments, the lid 247 is configured to provide a seal with the cover 237 or body 231, which in some forms may include a fluid tight seal. Thus, the lid 237 may provide an additional barrier or seal to prevent spillage or provide coverage of the internal volume 232. For example, the lid 237 may block or prevent liquid or other material or debris from entering the internal volume 232 of the containment module 212 or internal volumes 232a, 232b of the core modules 214a, 214b, 214c as well as the recessed portion 241 of the cover 237. Similarly, in one embodiment, the lid 247 is configured to block or prevent liquid or other materials from spilling from the internal volume 232 of the containment module 212 or internal volumes 232a, 232b of the core modules 214a, 214b, 214c beyond the recessed portion 241 of the cover 237.

As introduced above, in various embodiments, the dispenser system may comprise or be couplable with an implementation subsystem 218 comprising a plurality of core modules 214a, 214b, 214c. For example, the core modules 214a, 214b, 214c comprise core fittings 224a, 224b, 224c compatible with socket fittings 222a, 222b, 222c associated with the plurality of sockets 220a, 220b, 220c. In some embodiments, compatible fittings may be with respect to a diameter or circumference associated with the fittings. For example, compatible fittings may comprise threads or grooves configured to threadably engage or mate, compression fittings, clips, snaps, rings, collars, and the like. In the illustrated embodiment, each core module 214a, 214b, 214c comprises a core fitting 224a, 224b, 224c comprising one or more threads 245a, 245b, 245c formed at an outer surface 255a, 255b, 255c thereof. The one or more threads 245a, 245b, 245c are positioned to be received through one or more respective slots 256a, 256b, 256c, 257a, 257b, 257c of the socket fittings 222a, 222b, 222c and may therein be rotated into locking engagement between complementary threads 244a, 244b, 244c defined about the inner circumference of the sockets 220a, 220b, 220c. In various embodiments, the core fittings 224a, 224b, 224c are defined in a sleeve that may be received by the socket 220a, 220b, 220c. The sleeve may further comprise a second core fitting compatible with a third core fitting defined on the core module 214a, 214b, 214c. As such, the sleeve may comprise an adapter to increase the variety of core modules 214a, 214b, 214c that may be used with the dispenser system 100 or may be configured to improve fitment.

Figure 7:
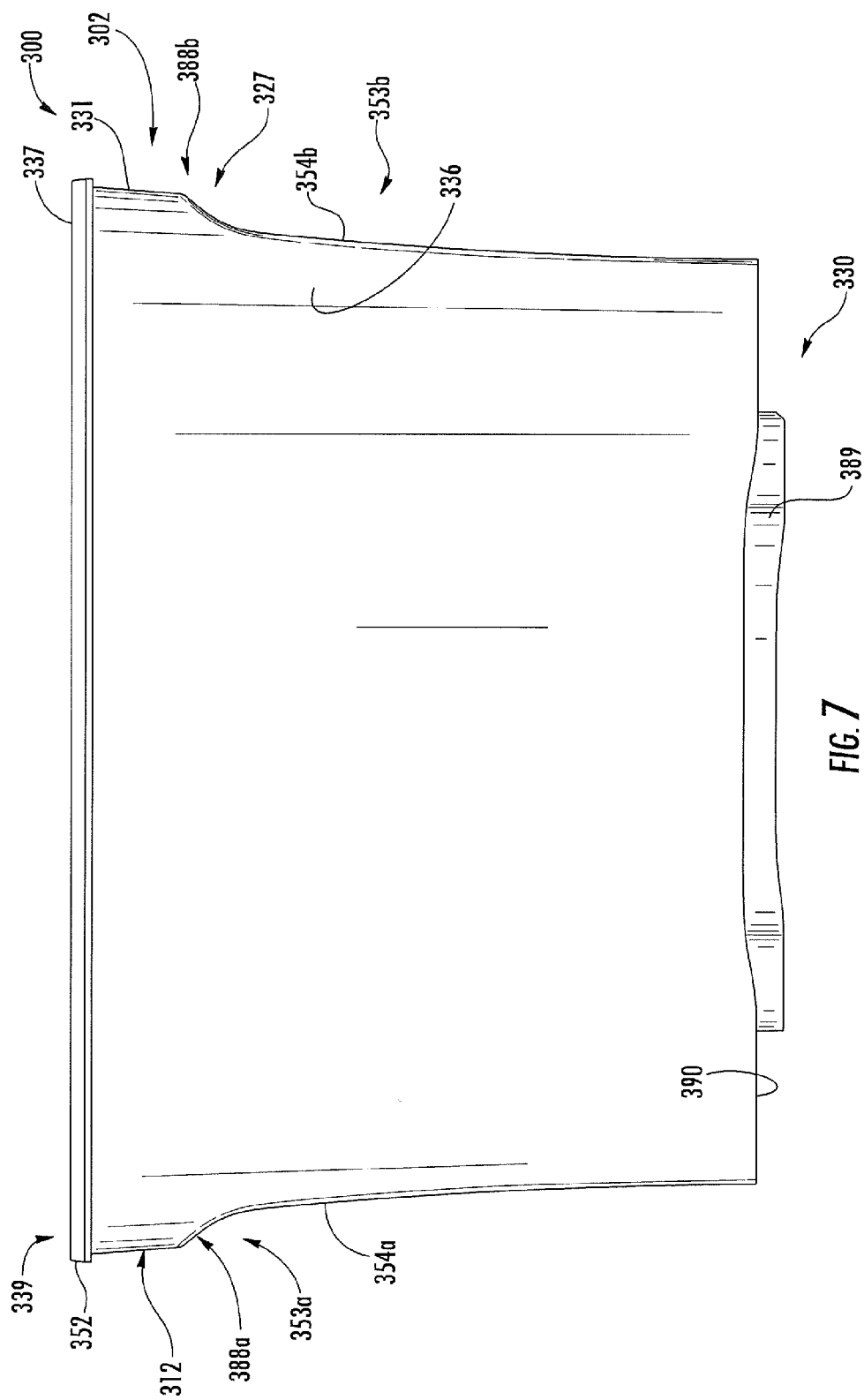
FIG. 7 is an elevated view of a dispenser system according to various embodiments described herein.
Figure 8:
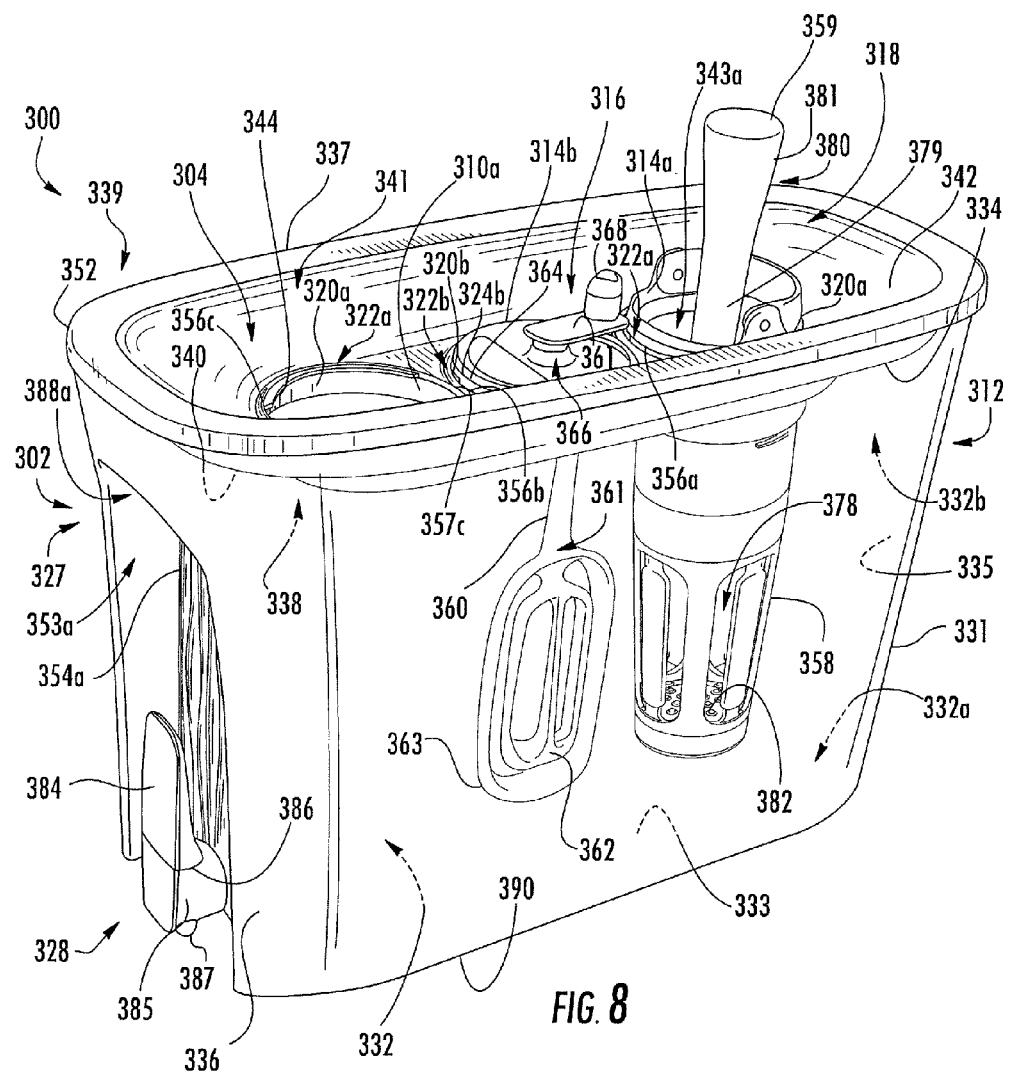
FIG. 8 is a perspective view of the dispenser system illustrated in FIG. 7 coupled to two core modules according to various embodiments described herein.

FIGS. 7 and 8 illustrate another embodiment of a dispenser system 300 according to various embodiments described herein. In certain respects, the dispenser system 300 illustrated in FIGS. 7 and 8 includes similar features as those previously described with respect to the dispenser systems 100, 200 described above. Accordingly, like features have been identified with like numbers and, therefore, for brevity, the accompanying descriptions will not be repeated. Briefly, the dispenser system 300 includes a dispenser platform 302 comprising a cover 337. The cover 337 further defines one or more of a plurality of sockets 320a, 320b, 320c of a core coupling module 312. In particular, the core coupling module 312 comprises a first socket 320a having a first socket fitting 322a, a second socket 320b having a second socket fitting 322b, and a third socket 320c having a third socket fitting 322c. A first core module 314a is received in the first socket 320a and is coupled thereto via respective first core fitting 324a and first socket fitting 322a, which are compatible. A second core module 314b is received in the second socket 320b and is coupled thereto via respective second core fitting 324b and second socket fitting 322b, which are also compatible. The third socket 320c is shown without a core module received therein. Beneficially, at least two of the first socket 320a, the second socket 320b, and the third socket 320c are configured to interchangeably receive core modules 314a, 314b comprising the same or similar compatible core fittings 324a, 324b, as described above.

The first core module 314a comprises an infuser including an infusion basket 358 configured to receive a muddling stick 359. The second core module 314b comprises an agitator configured to agitate liquid within the dispenser system 100. While not shown, the third socket 320a may selectively receive a third core module which may comprise an infuser, agitator, or other core module. It is noted that, in various embodiments, the core coupling module 312 may comprise or be configured to receive a cap that is positionable over a socket 320a, 320b, 320c, e.g., when a core module is not received in the socket 320a, 320b, 320c.

The agitation core illustrated in FIG. 8 comprises an agitator implement comprising an elongate stem 360. The elongate stem 360 has a first end 361 coupled to a first agitator body 362 and a second agitator body 363. The first and second agitator bodies 362, 363 are configured to extend into the internal volume 332. The agitation core further comprises a mounting body 364 defining the core fitting 324b. The mounting body 364 further defines a surface 365 dimensioned to engage the recessed surface 342 of the cover 337. In various embodiments, the mounting body 364 is configured to sealing engage with the cover 337 or socket 320b. A second end 366 of the stem 360 comprises a spindle that extends through the mounting body 364 and is rotatably coupled thereto. An arm 367 is mounted to the spindle and comprises a grip 368. In use, the arm 367 is rotatable to transmit rotation to the steam 360 and hence impart rotation to one or both of the agitator bodies 362, 363.

Referring to FIGS. 2-5, core module 214b depicts another embodiment of an agitator core. An elongate stem 260 defines a helical groove 269 along a portion of its length and is thereby movable within a guide 270 defined in a mounting body 264. A second end 266 of the stem 260 comprises an actuator 271 rotatably retained within a housing 272 that extends from the mounting body 264 through a portion of a handle 273. In use, a user may grip the actuator 271 and thereby push or pull the stem 260 through the guide 270 relative to the mounting body 264 to actuate the agitator. For example, actuation causes the helical groove 269 to ride through the guide 270, resulting in rotation of the stem 260 within the housing 272. A first end 261 of the stem 260, which is coupled to first and second agitation bodies 262, 263, thereby imparts its rotation to one or both of the agitator bodies 262, 263 when rotated.

In various embodiments, a core module comprises a thermal core configured to modulate a thermal state of the liquid within the dispenser system. For example, in one embodiment, a thermal core comprises a heater configured to heat the liquid. The heater may comprise a thermal element suitable for placement in contact with a liquid. For example, in one embodiment, the thermal element comprises a reservoir configured to receive a heated liquid. The heating element may be positioned in the internal volume to apply or dissipate thermal energy to the liquid within the internal volume. In a similar respect, in various embodiments, the thermal core comprises a cooler configured to chill the liquid within the system. For example, ice or a liquid at a lower temperature than the liquid within the system intended to be chilled may be contained or received in a thermal element comprising a reservoir. The cooler may them be positioned in the internal volume to absorb excess heat from the liquid within the internal volume.

Referring to FIGS. 2-5, core module 214a depicts one embodiment of a thermal core. The thermal core comprises a thermal element 274 defining a reservoir 275 for ice or a liquid. The thermal core is dimensioned to comprise a high surface area and defines three bores 276a, 276b, 276c extending through the element 274. Although not shown, the thermal core may comprise a handle configured to be attached to the body of the core at one or more attachment points 277a, 277b. In various embodiments, the thermal core comprises threads defined on its outer surface. The threads may be configured to threadably engage the first socket fitting or a sleeve configured to threadably engage the first socket 220a.

In various embodiments, a core module comprises an infusion core. Infusion cores generally comprises an infuser basket defining an internal volume configured to receive an infusion item therein. The infuser basket may be dimensioned to retain various sized infusion items and comprise various sized infusion pores. For example, in one embodiment, an infusion core comprises a herb or tea infuser comprising an infusion basket at least partially foimed with a mesh comprising relatively small pores. Those skilled in the art will recognize that pore size design may be at least partially dictated by the size of the intended infusion item and type of infusion. For example, core modules 214b and 314a comprise infusion cores, as illustrated in FIGS. 2, 3, 5 and 8, configured to receive infusion items such as fruits, vegetables, herbs, and the like. Therefore, the size of the pores 278, 378 defined in the baskets 258, 358 may be relatively large to, for example, reduce blockage and allow increased fluidity and hence increased interaction between the liquid outside the infuser and the infusion item.

Figure 2:
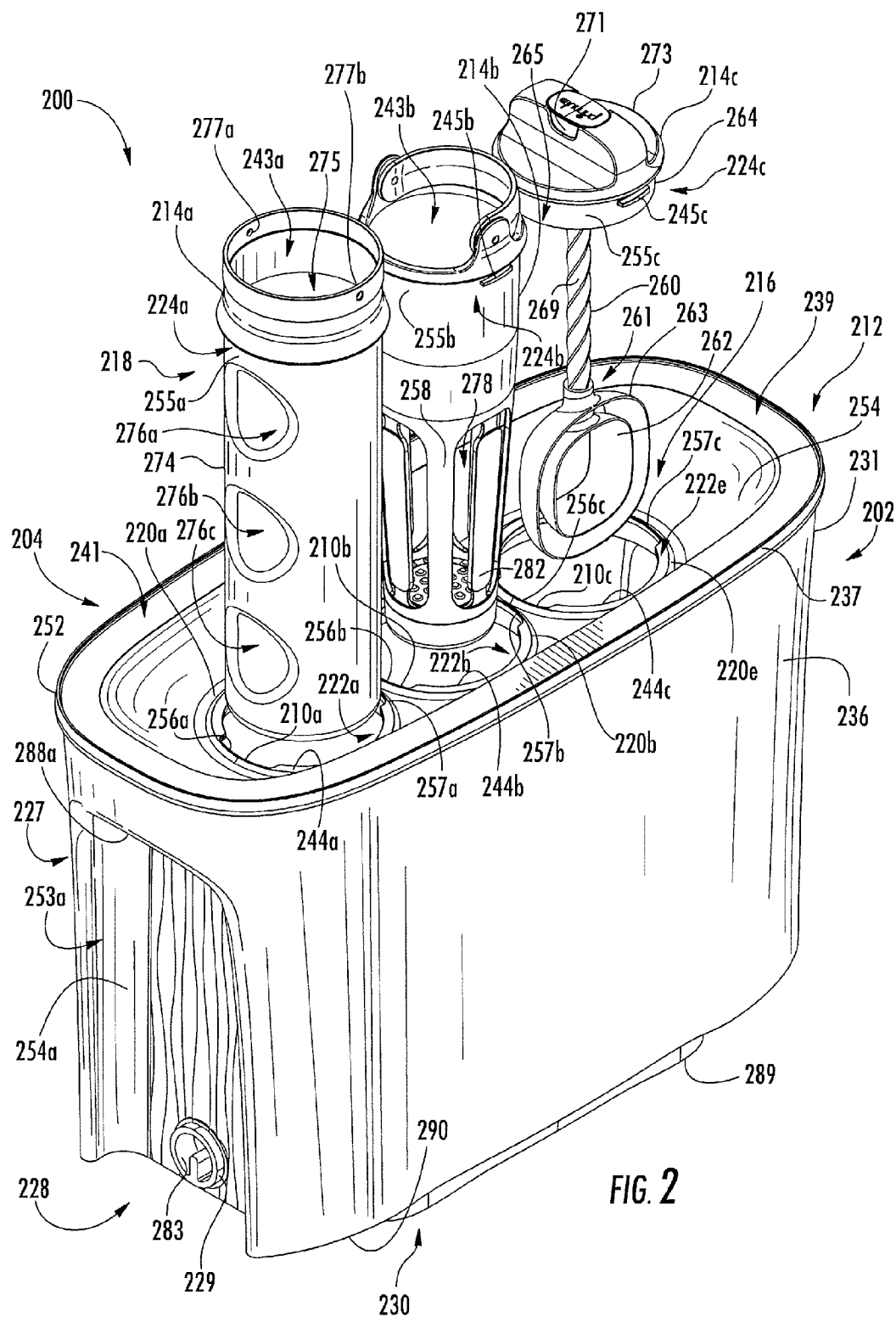
FIG. 2 is a partially exploded view in perspective of a dispenser system according to various embodiments described herein.

As shown in FIG. 8, the illustrated infusion core may also be dimensioned to receive a muddling stick 359 configured to muddle the infusion item. The muddling stick 359 comprises an elongate shaft 379 having a first end defining a muddling implement (not visible) and a second end 380 defining a handle 381. The muddler sticking stick 359 is movable through the infusion basket 358 to muddle the infusion item. In various embodiments, as shown in FIGS. 2, 5, and 8, the muddling action may be further promoted by various surface features 282, 382 within the infusion basket 258, 358 configured to contact and grip the infusion item when the muddling stick 359 compresses the infusion item thereon.

A described with respect to FIG. 1, in various embodiments, dispenser systems may comprises or be configured to incorporate an accessory subsystem comprising accessory modules such as a delivery module, a portability module, and a stability module.

The dispenser system illustrated in FIGS. 2-6 comprises a delivery module 228 configured to deliver, expel, or otherwise release liquid from the internal volume 232 of the containment module 212. The delivery module 228 comprises a second fluid port 229 positioned at the second end 232b of the internal volume 232 and is in fluid communication with the containment module 212. The second fluid port 229 comprises a fitting 283 configured to receive a plug, valve, or other fluid regulator configured to regulate delivery of fluid from the internal volume 232.

FIG. 8 illustrates a further embodiment of a delivery module 328 comprising an actuator 384 configured for selective operation of a valve 385. The actuator 384 is operatively coupled to the valve 385, which is configured to selectively open and close the valve 385 to regulate communication of the liquid between the internal volume 332 of the containment module 312 and an external environment. For example, a user may rotate the actuator 384 such that a surface 386 of the actuator 384 compresses against a portion of the body of the valve 385 to cause a piston coupled to the actuator 384 to extend through a passage within the valve 385 and thereby open the valve 385 to deliver the liquid from the internal volume 332 and out a delivery nozzle 387. In some embodiments, the valve 385 may be modular such that it may be removability received by a fitting associated with the second fluid port 229, as shown in FIG. 2, for example. Such removability may allow the dispenser system 300 to be cleaned more easily or reduce premature wear.

In various embodiments, the dispenser system comprises a portability module. In general, the portability module is configured to enhance the portability of the system to, for example, provide increased convenience. The portability module may comprise various transport features that may be implemented to transport the dispenser system. For example, in one embodiment, the body comprises or is configured to couple to one or more rotation members which may include a wheel or pivotable ball allowing a user to leverage the weight of the dispenser system upon the one or more rotation members for transport. In one embodiment, the portability module comprises rails or tracks.

The dispenser system 200 illustrated in FIGS. 2-5 illustrate one embodiment of a portability module 227 according to various embodiments. The portability module 227 comprises a first handle 288a and a second handle 288b. Each handle 288a, 288b is positioned at an outer surface 236 of the body. In various embodiments, each handle 288a, 288b is positioned within a respective recess portion 253a, 253b or may otherwise extend outward of the body 231 such that a user may grasp the handle 288a, 288b. For example, in one embodiment, one or both handles 288a, 288b are pivotably mounted to the body 231 such they may be pivoted away from the body 231. In the illustrated embodiment, the handles 288a, 288b are integral or otherwise formed on recessed surfaces 254a, 254b of the recessed portions 253a, 253b. Although not shown, the handles 288a, 288b may comprise grips configured to provide improved gripability. For example, the grip may comprise surface features formed on the body 231 configured to increase gripability or otherwise complement a contour of a hand. Additionally, in one embodiment, the grip comprises a compressible or elastomeric material such as a foam, rubber, or polymer, for example, that may compressibly conform to the hand of a user. In one embodiment, the handle 288a, 288b or grip portion may comprise or be coated with an thermally insulative material, for example, to reduce buildup of condensation on the handle 288a, 288b or reduce the transfer of thermal energy between the dispenser system 100 and the user when the handle 288a, 288b is gripped.

In various embodiments, the dispenser system comprises a stability module. In general, the stability module is configured to provide a stable platform from which the dispenser system may operate. The dispenser system 200 illustrated in FIGS. 2-5 comprises a stability module 230 comprising a foot 289 extending from a lower surface 290 of the body 231. According to various embodiments, the foot 289 comprises the same or similar material as the body 231, which may simplify cleaning. In some embodiments, the foot 289 comprises a material or structure configured to grip an adjacent surface upon which the foot 289 rests. For example, in one embodiment, the foot 289 is coated with a non-slip material or is structured to compressingly engage the adjacent surface under the weight of the dispenser system 200. For example, in one embodiment, the foot 289 is structured to adhere or bias to the adjacent surface via suction applied between the foot 289 and the adjacent surface. Although not shown, according to some embodiments, the stability module 230 may further comprise a shoe configured to be positioned on the foot 289. The shoe may be fittably received on or adhered to the foot 289 and thereby impart an increased grip with the adjacent surface, as described above. For example, the shoe may comprise an tacky or elastomeric material such as a rubber or polymer such as a silicone, for example, that may be selectively received and removed from the foot 289. Beneficially, as the shoe is removable, shoes may be replaced or interchanged depending on the type of adjacent surface. Similarly, the shoe may be removed for easy cleaning.

Figure 9:
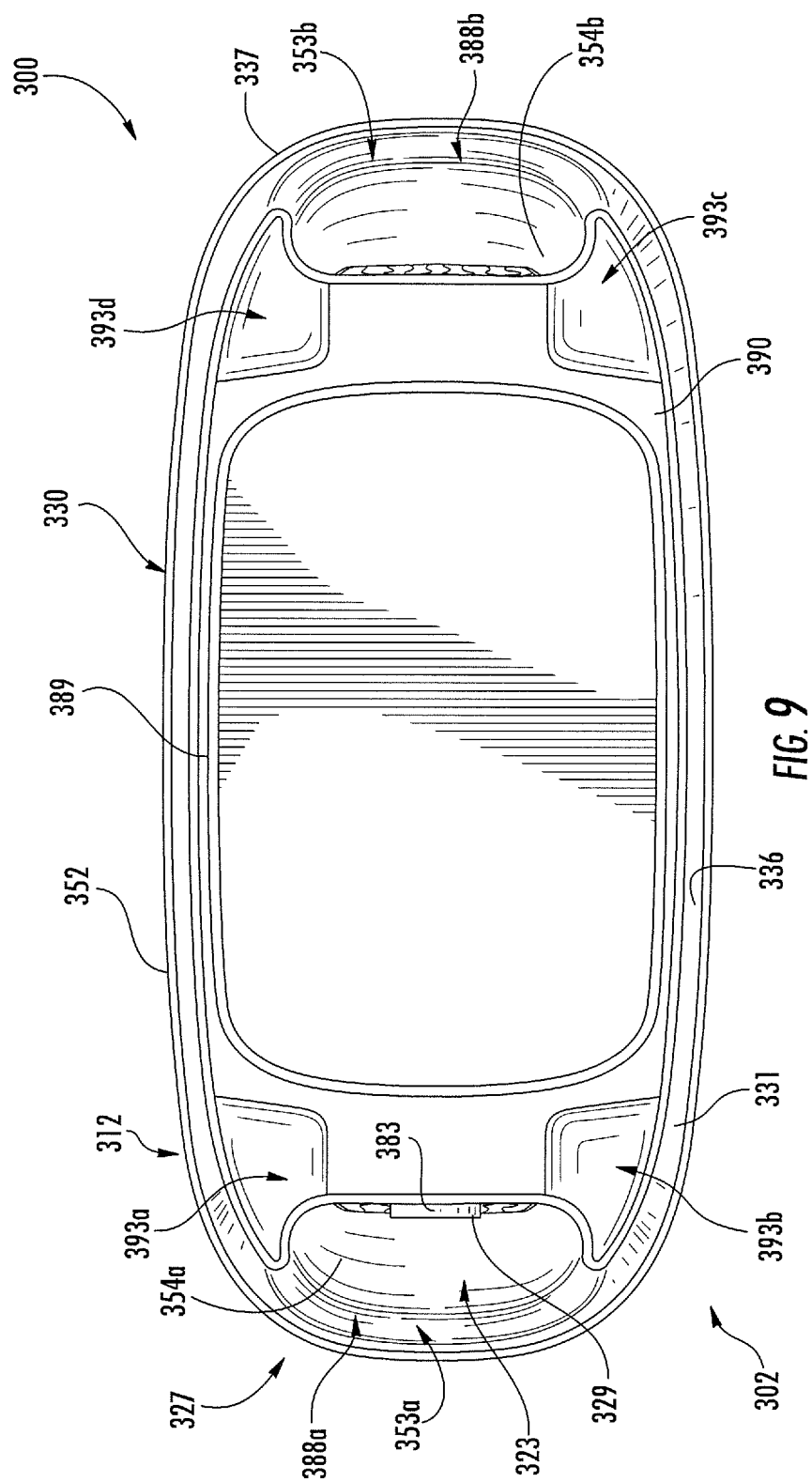
FIG. 9 is a bottom view of the dispenser system illustrated in FIG. 7 according to various embodiments described herein.
Figure 10:
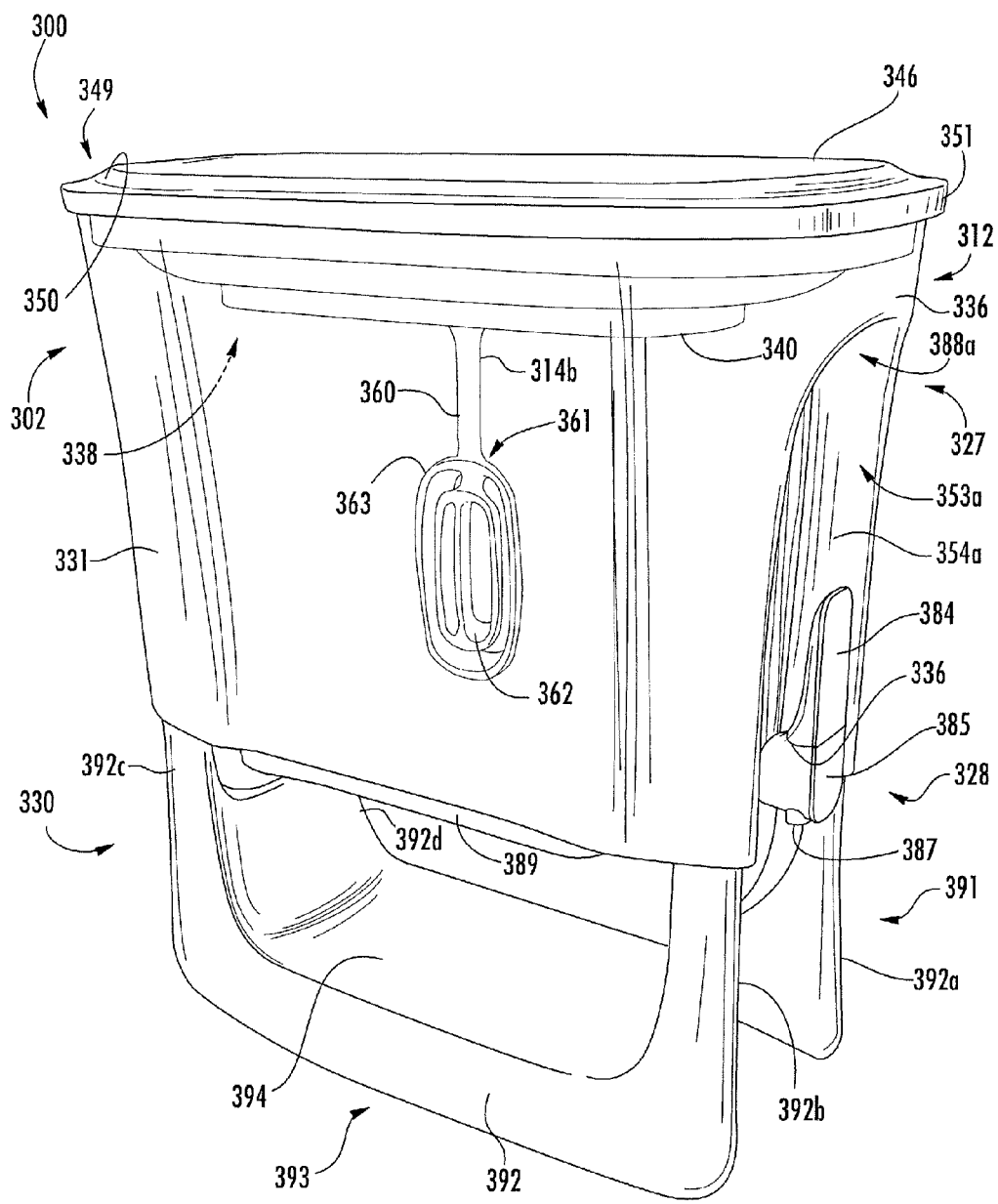
FIG. 10 is a perspective view of the dispenser system illustrated in FIG. 7 including a base and lid according to various embodiments described herein.

FIGS. 9 and 10 illustrate the dispenser system 300 including a lid 346 and a stability module 330 and having a single core module 314b received within the dispenser system 300. In various embodiments, the stability module 330 comprises a base 391. Referring to FIG. 10, the base 391 comprises an extension 392 configured to raise the lower surface 390 of the dispenser system 300 body 331 with respect to a surface upon which the dispenser system 300 may rest. The extension 392 of the base 391 includes four legs 392a, 392b, 392c, 392d each comprising an end (illustrated as received) configured to be received within a fittings 393a, 393b, 393c, 393d disposed at the lower surface 390 of the body 331, as shown in FIG. 9. The legs 392a, 392b, 392c, 392d are coupled by cross-member 294 to form a foot 395.

In various embodiments, the lid, cover, or body may comprise a thermally insulative material configured to provide thermal insulation with respect to the dispenser system and the external environment.

It will be appreciated that spatial terms may be used herein with respect to the described embodiments. It is to be appreciated that such spatial terms are generally used to describe spatial location of features relative to other features are not intended to be limiting. To assist the reader in understanding the present description, certain features are described using familiar language for convenience and clarity. For example, spatial terms such as top, bottom, lower, upper, side, etc. are used herein with respect to the illustrations. However, dispenser systems and related apparatuses may be configured in many orientations, and these terms are not intended to be limiting and absolute.

It will be recognized by those of skill in the art that features or components of particular embodiments described herein can be used in conjunction with other embodiments described herein and/or with other embodiments within the scope of the claims.

Although the foregoing description has necessarily presented only a limited number of embodiments, those of ordinary skill in the relevant art will appreciate that various changes in the systems, apparatuses, and methods and other details of the examples that have been described and illustrated herein may be made by those skilled in the art, and all such modifications will remain within the principle and scope of the present disclosure as expressed herein and in the appended claims. For example, although the present disclosure has necessarily only presented a limited number of embodiments of dispenser systems and dispenser devices and related apparatuses, and also has necessarily only discussed a limited number of related methods for preparing, retaining, or dispensing a liquid using a dispenser system, dispenser, or related apparatus, it will be understood that the present disclosure and associated claims are not so limited. Those having ordinary skill will readily identify additional dispenser systems, dispensers, and related apparatuses and methods and may design and build and use additional dispenser systems, dispensers, and related apparatuses and methods along the lines and within the spirit of the necessarily limited number of embodiments discussed herein. It is understood, therefore, that the present invention is not limited to the particular embodiments or methods disclosed or incorporated herein, but is intended to cover modifications that are within the principle and scope of the invention, as defined by the claims. It will also be appreciated by those skilled in the art that changes could be made to the embodiments and methods discussed herein without departing from the broad inventive concept thereof.

What is claimed is:

1. A core coupling module for use with a beverage dispenser system to interchangeably couple a plurality of core modules of an implement subsystem to a dispenser platform, wherein the dispenser platform includes an internal volume defined by a containment module body for containing a liquid, the core coupling module comprising:

a cover having a lower surface and an upper surface, the cover positionable on a containment module body and configured to simultaneously couple at least two core modules such that, when the cover is positioned on the body, the cover positions portions of coupled core modules within an internal volume defined by the body; and a plurality of sockets extending through the cover between the lower surface and a recessed surface portion of the upper surface, the upper surface dimensioned to direct liquid along the upper surface toward the recessed surface portion, each socket comprising a socket fitting configured to couple to a compatible core fitting configuration disposed on a core module of an implement subsystem, wherein at least two of the socket fittings are configured to couple to a same compatible core fitting configuration to interchangeably couple core modules comprising the same compatible core fitting configuration.

2. The core coupling module of claim 1, wherein the at least two socket fittings are configured to lockingly engage the same compatible core fitting configuration.

3. The core coupling module of claim 2, wherein the at least two socket fittings each comprise slots configured to lockingly engage one or more threads of the compatible fitting configuration.

4. The core coupling module of claim 1, wherein the at least two socket fittings are configured to interchangeably couple the core modules such that, when the cover is positioned on the containment module body, the core modules are positioned to contact liquid contained in the interior volume to thereby modulate at least one characteristic of the liquid.

5. The core coupling module of claim 4, wherein the at least two socket fittings comprise at least three socket fittings.

6. The core coupling module of claim 4, wherein the cover is configured to couple, at the socket fittings, at least two core modules of the implement subsystem selected from an agitation core, a thermal core, an infusion core, or combination thereof.

7. The core coupling module of claim 4, wherein the cover is configured to interchangeably couple, at either of the at least two socket fittings, a core module of the implement subsystem comprising an infusion core comprising an infusion basket configured to receive a muddling stick, and wherein the muddling stick is translatable therein to muddle an infusion item contained in the infusion basket and thereby modulate a flavor characteristic of the liquid when the cover is positioned on the body.

8. The core coupling module of claim 4, wherein the cover is configured to interchangeably couple, at either of the at least two socket fittings, a core module of the implement subsystem comprising a sleeve defining the compatible core fitting configuration and an implement portion configured to selectively couple to the sleeve.

9. The core coupling module of claim 4, wherein the upper surface of the cover defines a concave wall that extends to the recessed surface portion to direct liquid along the concave wall and through the plurality of sockets.

10. A dispenser system comprising:
a reception module comprising a first fluid port configured to receive a liquid from a liquid source external to the dispenser system;
a containment module comprising a body configured to contain the liquid received by the reception module within an internal volume;
an implement subsystem comprising core modules positionable within the internal volume to modulate a characteristic of liquid contained therein, wherein the core modules comprise at least two core modules selected from an agitation core, a thermal core, an infusion core, or combination thereof; and
a core coupling module comprising a cover positionable on the body and configured to couple the core modules of the implement subsystem to position portions of coupled core modules within the internal volume when the cover is positioned on the body, the cover comprising,
a lower surface,
an upper surface,
at least a first socket and a second socket extending through the cover between the lower surface and a recessed portion of the upper surface, the upper surface dimensioned to direct liquid along the upper surface toward the recessed surface portion, and
a first socket fitting disposed at the first socket and a second socket fitting disposed at the second socket, wherein the first socket fitting and the second socket fitting are configured to couple to a same compatible core fitting configuration to interchangeably couple core modules of the implement subsystem comprising the compatible core fitting configuration at either the first socket or the second socket.

11. The dispenser system of claim 10, wherein the first socket fitting and the second socket fitting are configured to lockingly engage the compatible core fitting configuration.

12. The dispenser system of claim 10, wherein the upper surface of the cover defines a concave wall that extends to the recessed surface portion to direct liquid along the concave wall and through the plurality of sockets.

13. The dispenser system of claim 11, wherein the cover is movable between an open position and a closed position, and wherein, when the cover is in the open position, the first fluid port is at least partially open to expose the internal volume.

14. The dispenser system of claim 13, further comprising a delivery module, wherein the delivery module comprises a valve fluidically coupled to the internal volume through a second fluid port, wherein the valve is selectively actuatable between an open position and a closed position to control delivery of the liquid from the internal volume to an environment external to the dispenser system.

15. The dispenser system of claim 10, wherein the core coupling module comprises a third socket extending through the cover between the lower surface and the recessed portion and a third socket fitting disposed at the third socket, wherein the third socket fitting is configured to couple to the same compatible core fitting configuration as the first socket fitting and the second socket fitting to interchangeably couple core modules of the implement subsystem comprising the compatible core fitting configuration at either the first socket, second socket, or third socket, and wherein the implement subsystem comprises an agitation core, a thermal core, and an infusion core.

16. The cover of claim 15, wherein the socket fittings of the plurality of sockets are configured to lockingly engage the compatible core fitting configurations to thereby lock the core modules to the respective sockets when coupled thereto.

17. A cover for a beverage dispenser, the cover comprising:
a lower surface;
an upper surface comprising a recessed surface portion, the upper surface dimensioned to direct liquid along the upper surface toward the recessed surface portion;
a plurality of sockets extending through the cover between the lower surface and the recessed portion, each socket comprising a socket fitting configured to couple a compatible core fitting configuration of a core module to position at least a portion of the coupled core module within an interior volume of a beverage container body to which the cover is positioned on, the plurality of sockets comprising,
  a first socket comprising a first socket fitting, the first socket fitting compatible with a first core fitting configuration; and
  a second socket comprising a second socket fitting, the second socket fitting compatible with a second core fitting configuration;
wherein the first socket fitting is further compatible with the second core fitting configuration such that the first socket is configured to interchangeably couple core modules comprising either the first core fitting configuration or the second core fitting configuration.

18. The cover of claim 17, wherein the plurality of sockets further comprises a third socket comprising a third socket fitting, wherein the third socket fitting is compatible with a third core fitting configuration and at least one of the first core fitting configuration and the second core fitting configuration such that the third socket is configured to interchangeably couple at least one of core modules comprising either the first core fitting configuration or the third core fitting configuration and core modules comprising either the second core fitting configuration or the third core fitting configuration.

19. The cover of claim 18, wherein the first socket, the second socket, and the third socket are configured to interchangeably couple core modules comprising either the first core fitting configuration, the second core fitting configuration, or the third core fitting configuration.

* * * * *